Inventors:
Robert C. DeVries,
James F. Fleischer,
by
Their Attorney.

United States Patent Office 3,772,428
Patented Nov. 13, 1973

3,772,428
CONTINUOUS GROWTH OF CUBIC BORON NITRIDE
Robert C. De Vries, Burnt Hills, and James F. Fleischer, Scotia, N.Y., assignors to General Electric Company
Filed Jan. 28, 1971, Ser. No. 110,514
Int. Cl. C01b *21/06, 35/00;* B01d *9/00*
U.S. Cl. 423—290
4 Claims

ABSTRACT OF THE DISCLOSURE

A previously unknown composition line has been defined in the cubic boron nitride-stable region for the Li-B-N system. By (a) selecting a composition on this new line, (b) subjecting the given composition to constant pressure, while rapidly reaching an initial crystallization temperature and then (c) very slowly raising the temperature, the crystallization of cubic boron nitride can be initiated and continued.

---

The preparation of cubic boron nitride is disclosed in U.S. Pat. No. 2,947,617—Wentorf, Jr., which patent describes the starting reaction mixture as containing a source of boron, a source of nitrogen, and a source of catalyst metal, the catalyst metal being selected from the class consisting of alkali metals, alkaline earth metals, tin, lead, and antimony.

U.S. Pat. No. 3,192,015—Wentorf covers the invention of preparing large crystals of cubic boron nitride by applying successive layers of cubic boron nitride crystalline material over the cubic boron nitride seed. The entire disclosure is specific to cubic boron nitride growth on cubic boron nitride seeds using, in some examples, a method wherein a temperature of about 1600° C. is rapidly reached and then gradually increased to a temperature of from about 1700 to 1750° C. Care was taken to minimize excessive spontaneous nucleation of cubic boron nitride crystals, while the layers on the seed crystals were in the process of growing. Some spontaneous cubic boron nitride crystal formation is reported, but apparently the size of the resulting crystals was too small to be recorded. Large cubic boron nitride crystals were prepared by repeating the coating process to provide successive layers on a cubic boron nitride seed. This need for applying successive layers to substantially increase crystal size is due to the fact that there is a limit to the thickness of cubic boron nitride material that can be applied to the "seed" each time the coating process is carried on.

Thus, process conditions necessary for accomplishing longer continuous growth of cubic boron nitride crystals either with or without a seed crystal in order to produce a large cubic boron nitride crystal are not disclosed in U.S. 3,192,015. Such capability would be of definite commercial value.

SUMMARY OF THE INVENTION

Continuous growth of cubic boron nitride for longer periods with or without a cubic boron nitride seed is accomplished by (a) selecting a lithium/boron/nitrogen composition on or substantially on a previously unknown crystallization line for the Li-Bn-N system in the cubic boron nitride-stable region, (b) subjecting this composition to constant pressure, while rapidly increasing the temperature thereof to a temperature below 1550° C., (c) thereafter slowly (at a rate of 2°–15° C./min.) increasing the temperature to a temperature in the range of from about 1600°–1650° C., (d) cooling, (e) releasing the pressure and (f) removing the reaction cell for isolation of the cubic boron nitride crystals formed.

BRIEF DESCRIPTION OF THE DRAWING

The exact nature of this invention as well as objects and advantages thereof will be readily apparent on consideration of the following specification relating to the annexed drawing wherein.

DESCRIPTION OF THE PREFERRED EMBODIMENT

Figure 1:
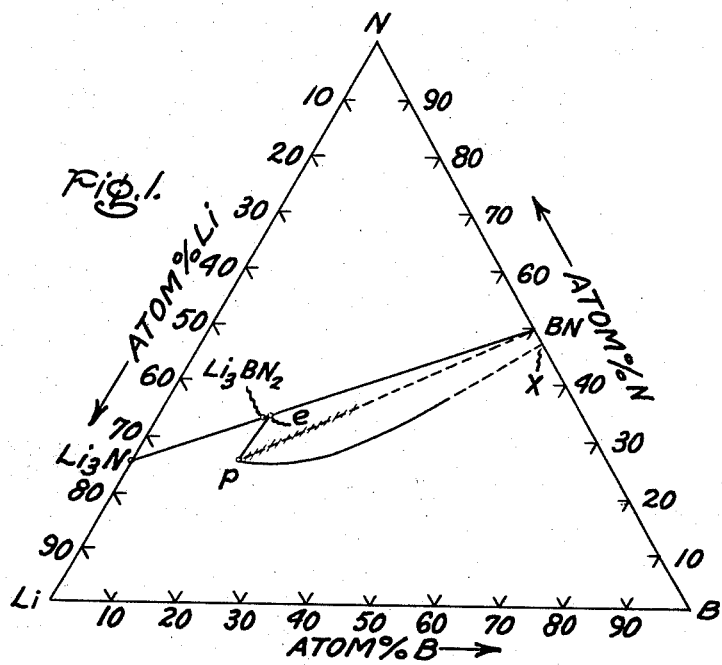
FIG. 1 represents the phase diagram for the Li-B-N system having defined thereon the cubic boron nitride stability region at a pressure of 55 kilobars (kb.) for compositions in the BN-Li$_3$N-Li-B portion of the Li-B-N system

The cubic boron nitride stability region represented in FIG. 1 is the area defined by *e*, BN, X, P, *e* at a pressure of 55 kb. At higher pressures, the area of this region will be slightly larger than shown and at lower pressures the area of this region of this stability region will be slightly smaller than shown. Studies of the phase relationships in this region have shown that a ternary invariant point (probably a peritectic reaction) exists at or near P, where the high pressure form of Li$_3$BN$_2$, cubic boron nitride, an unidentified boron-rich phase and liquid coexist under equilibrium conditions. This ternary invariant point, P, occurs at a temperature at least 60° C. lower (at pressures in the 50–55 kb. range) than the binary eutectic (e), which forms along the Li$_3$N-BN composition line.

The above-defined cubic boron nitride stability region is also described in U.S. patent application Ser. No. 110,513—De Vries et al., filed Jan. 28, 1971 and assigned to the assignee of the instant invention. Also, the aforementioned patent application describes the necessity of the presence of oxygen during the reaction to produce cubic boron nitride crystals in the lithium-boron-nitrogen system when lithium-rich compositions are employed (particularly if much of the lithium is present as Li$_3$BN$_2$). The preferred mechanism for achieving the desired oxygen concentration is by the addition of either (a) B$_2$O$_3$ or (b) a boron source (e.g. boron metal) plus at least one decomposable metal oxide. It is to be understood that in the practice of the instant invention sufficient oxygen is to be available to the reaction zone either by the design of the reaction vessel or by the use of additives as described in the aforementioned patent application.

The discovery of the ternary phase relationships and the ternary invariant point P shown in FIG. 1 appears to have provided for the first time the opportunity to optimize crystal growth procedures within the Li-B-N system. This opportunity did not materialize in the manner in which it was expected, however, and the reasons are best described in connection with FIG. 2.

Figure 2:
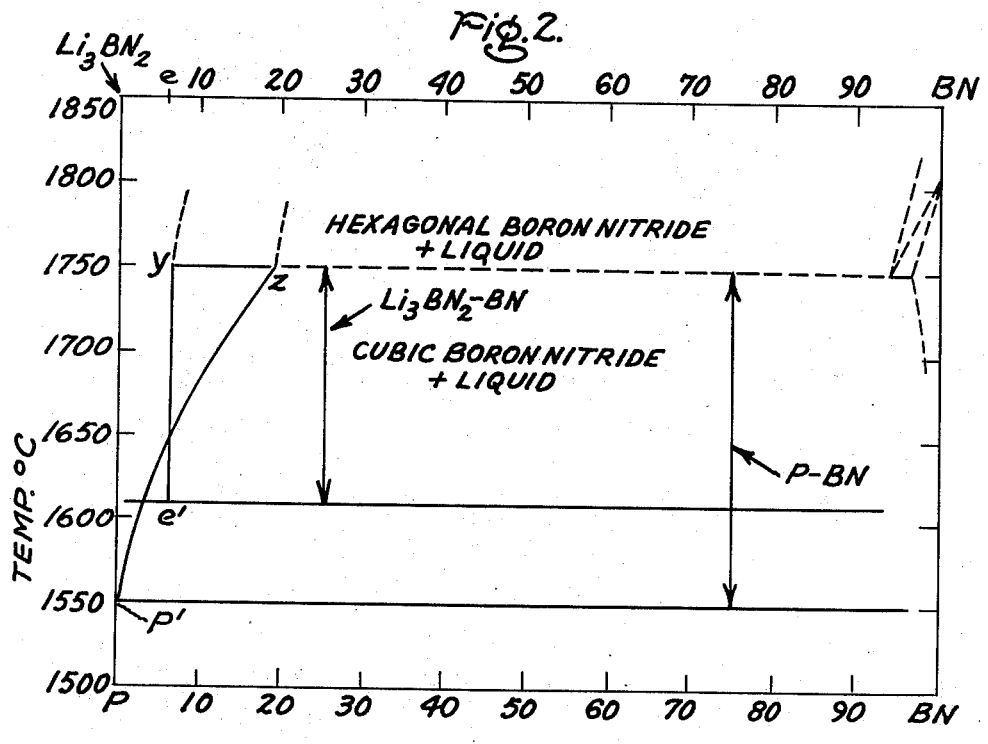
FIG. 2 presents a comparison between the solubility (or liquidus) curve profiles for cubic boron nitride for the prior art composition line and for the composition line of the instant invention, both composition lines being shown in FIG. 1.

Concentrations existing along the line extending from P to BN (FIG. 1) are plotted along the bottom edge of FIG. 2 and, similarly, concentrations existing along the line extending from Li$_3$BN$_2$ to BN (FIG. 1) are plotted along the top edge of FIG. 2. Both sets of values are plotted as a function of temperature. In FIG. 2, *e'* represents the temperature at the eutectic composition *e* and P' represents the temperature at composition P. If the parameter of temperature were added as a third dimension extending up from the plane of FIG. 1 over the area of cubic boron nitride stability shown (area *e*, BN, X, P, *e*) a temperature-composition volume (not shown) would be generated. Cross-sections taken through such a volume, one passing through the Li$_3$BN$_2$-BN line and one passing through the P-BN line are both displayed in FIG. 2. The crosssection through P-BN line has a significantly larger stability region for cubic boron nitride phase plus liquid phase than the cross-section through line Li$_3$BN$_2$-BN, because of the temperature (see P') and composition of point, P relative to point $e$.

As long as pressure-temperature-composition conditions are maintained such that cubic boron nitride coexists with a liquid phase, crystallization paths (or, stated another way, how the liquid phase changes composition as cubic boron nitride precipitates) in each of these sections can be properly defined in terms of a binary system even though compositions along P-BN must be defined in terms of the components of a ternary system. In fact, binary type phase relationships could be used to describe the crystallization of cubic boron nitride for compositions along any line radiating from BN and terminating at line $e$-P or curve P-$x$ as long as the temperature being considered was consistent with the coexistence of cubic boron nitride plus liquid and no other solid phase was present. However, of all the lines that may be so defined, compositions along the line P-BN will present the lowest temperature for the coexistence of cubic BN and liquid.

The use of binary phase relationships in this manner is consistent with the theory of phase equilibria in heterogeneous systems as described in physical chemistry textbook (e.g., The Phase Rule and Heterogeneous Equilibrium, John E. Rucci, Dover Publication, 1966) and with standard ceramics and metallurgical practice (Phase Diagrams for Ceramists, E. M. Levin et al., The American Ceramic Society, 1964).

It may be shown from FIG. 2 that far more favorable conditions for normal growth from solution appear to exist for the deposition of cubic boron nitride by the temperature gradient method along composition line P-BN as contrasted to operation along line Li$_3$BN$_2$-BN. Thus, the slope of the liquidus (or solubility) curve P'-$z$ for concentrations along line P-BN is much less steep than the liquidus curve $e'$-$y$ for concentrations along the Li$_3$BN$_2$-BN line. In fact, the slope of the liquidus curve along the composition line P-BN is less steep than the slope of any other section radiating through point BN and passing through the cubic boron nitride primary phase region shown. Further, an additional temperature range amounting to about 60° C. is available with liquidus curve P'-$z$, because the ternary invariant point, P, is lower in temperature than the eutectic point, $e$, and the upper temperature limit for cubic boron nitride stability is about the same in both cases.

It would appear that the temperature gradient afforded by the less steep profile of the liquidus curve P'-$z$ should enable the deposition of more cubic boron nitride crystalline material per unit of temperatured rop for compositions along line P-BN than for operation with other compositions (e.g. compositions along Li$_3$N-BN) lying in the primary phase region shown for cubic boron nitride for the Li-B-N system. Further, it would seem that by selecting compositions along P-BN having a composition with a low boron nitride content (closer to P) fewer crystals would nucleate and these would grow larger. Thus, in contrast to operation with high BN compositions with which many small crystals nucleate and interfere with each other as they grow, compositions rich in Li would be chosen for growth of individual single crystals.

Unfortunately, however, numerous attempts to grow cubic boron nitride from compositions along line P-BN by slow cooling starting from temperature above the solubility curve (P'-$z$) or above about 1750° C. (the location of the isothermal boundary between the solubility regions of cubic boron nitride plus liquid and hexagonal boron nitride plus liquid) have all resulted in early poisoning of the system by the formation of a lithium borate melt around the developing cubic boron nitride crystals. It appears that this lithium borate melt prevents nutrient from reaching the crystals. The same result is also obtained for extended isothermal heating at high temperatures of a composition on the P-BN line.

Yet, if substantially the reverse approach is taken, excellent results are obtained. Thus, it has been found that fewer, larger and better formed cubic boron nitride crystals are produced by (a) selecting a composition along or substantially on the line P-BN (e.g. cross-hatched region on P-BN) having a lithium content of greater than about 40 mole percent, (b) applying thereto static pressure at a value in the cubic boron nitride-stable region, (c) rapidly heating (at a rate of at least about 50°/minute increase in temperature) the pressurized reaction mass to temperature at or below a threshold temperature below which liquid begins to form (e.g. about 1550° C. for a pressure of about 55 kb), (d) slowly heating (about 2°–15° C./minute) the pressurized reaction mass to a temperature of about 1650° C. or less than 1750° C., (e) turning off the power to the heater (quenching), (f) gradually removing the pressure and (g) recovering the reaction mass.

If the composition employed is selected as described hereinabove, when the given composition is heated up under pressure, a temperature will be reached (at or near 1550° C.) at which liquid will form and cubic boron nitride crystals will nucleate and grow. Under these conditions cubic boron nitride and liquid will co-exist and cubic boron nitride will grow substantially free of other phases for a much longer growth perod than has previously been experienced.

It appears that in the formation of cubic BN starting from the Li-B-N system two principal reaction mechanisms are competing:

(1) the nucleation and growth of cubic boron nitride and
(2) the formation of a lithium-boron-oxygen liquid.

The first of these reactions is the catalyzed reaction for cubic boron nitride as described in Wentorf 2,947,617. The second reaction accompanies the first either via the diffusion of oxygen into the mixture from heated cell parts or by the deliberate addition of decomposable metal oxide(s) in the system. In fact, although it is not fully understood, it appears that some oxygen is essential for the first reaction mechanism. Although the theory is not well defined it appears that the role of oxygen in lithium-rich mixtures is one of reaction with lithium and boron to produce a lithium borate melt with which cubic boron nitride will co-exist. However, the conversion of the nutrient liquid to an oxide liquid to the extent that any given crystal of cubic boron nitride becomes surrounded by the oxide liquid terminates growth of that crystal, because nutrient material can no longer reach the crystal.

The relative rates of the two reaction mechanisms are not known quantitatively, but it is clear that the accumulation of the viscous lithium-boron-oxygen liquid increases with time and with temperature. Although the exact reaction rates cannot be defined, it has been found that programmed heating cycles can be employed to optimize reaction mechanism (1) above with respect to reaction mechanism (2) above to provide a longer period of continuous growth. Thus, a range of heating rates exists over which the accumulation of the oxide liquid apparently can be delayed while the cubic boron nitride crystals grow. The heating rate to be selected is a function of reaction cell design and the facility of the cell for attaining thermal equilibrium. The optimum heating rate may be easily determined by selecting and routinely trying heating rates between about 2° and 15° C. per minute. In small volume reaction vessels in which thermal equilibrium is readily attained heating rates of about 2° to 5° C. per minute are generally best.

This programmed heating plus the lower initial temperature of cubic boron nitride synthesis from P-BN compositions make it possible to grow crystals over a lower temperature range than was previously possible thereby minimizing the problem of oxide liquid formation at least in the early stages of crystal growth.

This raising of the temperature through the region in which cubic boron nitride is stable as opposed to slowly dropping the temperature through this same region leads to the initial nucleation of many small crystals. However, during this gradual increase in temperature the smallest of these crystals will be the first to go back into solution as the system approaches the equilibrium concentration of these crystals. This dissolution phenomenon is supported by the application of the lever rule principle to the solubility curve for the P-BN section (FIG. 2).

Herein lies the advantage of operation with the solubility curve P'–z as compared to the solubility curve e'–y for the $Li_3BN_2$-BN section along which, because of the steep slope thereof, there is not much change in the percentage of crystals formed as a function of temperature. Experiments have substantiated that programmed heating produces greater amounts of large crystals in proportion to the amounts of very small crystals than are produced by any other heating and cooling programs run on the identical compositions.

By use of the slow heating method of this invention a factor of 2 to 3 times increase in size has been achieved with a given apparatus over that achieved by the method of simply raising the temperature and holding at some preselected temperature for a few minutes. An additional advantage is that these larger crystals are also well-formed, because they have grown under conditions in which fewer crystals are present and, thereby, have not significantly interfered with each other during the growing process as in the case wherein many small crystals are present.

Variations of the heating sequences have been employed but in no case has the growth of cubic boron nitride crystals been improved over the results obtained from slow heating. Thus, very rapid heating to 1700° C. followed by holding for a short time (5 minutes) at this temperature resulted in good total conversion but most of the crystals were less than 0.05 mm. and only a few were greater than 0.1 mm. Rapid heating to 1650° C. followed by holding at this temperature for an extended period resulted in a predominance of oxide liquid with only a few (.05–0.1 mm.) cubic BN crystals. When the rapid heating to 1650° C. was followed by slow cooling the size of cubic boron nitride crystals did not increase but the amount of the oxide liquid increased. Very slow heating (less than about 2° C./minute) also apparently only increases the amount of oxide liquid and does not improve the size of the crystals. Programmed heating rates (for compositions on or substantially on line P-BN having a lithium content of greater than about 40 mole percent) in the range of about 2° to about 15° C./minute have always increased the number of larger crystals at the expense of the smaller crystals. Heating rates in the range of about 2° to about 5° C./minute have proved most suitable.

In the following examples all percentages are in mole percent unless otherwise indicated. The compositions are all located on or substantially on the P-BN line of FIG. 1. In order to obviate overshooting the 1550° C. threshold, the slow programmed heating was begun after rapid temperature rise to 1400° C.

Example 1

A mixture of 57.2% $Li_3BN_2$+13.6% BN+29.2% B (43 atom percent Li, 25 atom percent B, 32 atom percent N) was rapidly heated (70°/min.) at 55 kb. in a Ta-lined reaction vessel to 1400° C. and then heated at a rate of 2° per minute to 1600° C. at constant pressure. The cell was rapidly cooled to room temperature and some large (up to 0.5 mm.) well formed cubic boron crystals were found in a glassy matrix. Most crystals in this experiment were greater than 0.1 mm. and many were greater than 0.2 mm.

Example 2

A mixture of 57.2% $Li_3BN_2$+13.6% BN+29.2% B (43 atom percent Li, 25 atom percent B, 32 atom percent N) was rapidly heated at 55 kb. at 70°/min. in a Ta-lined high pressure cell to about 1400° C. and then heated at constant pressure at a rate of about 2°/min. to about 1650° C. and a good yield of crystals in the range of 0.05 mm. to 0.25 mm. was produced.

Example 3

A mixture consisting of 43 atom percent Li, 25 atom percent B, 32 atom percent N was heated in a Ta-lined cell at 55 kb. to 1400° C. at a rate of 70° C./minute. The cell was then heated at constant pressure to 1600° C. at 4.7° C./minute. A good yield of well formed cubic boron nitride crystals in the size range of 0.25–0.5 mm. was achieved.

Example 4

A mixture of 57.2% $Li_3BN_2$+13.6% BN+29.2% B was rapidly heated in a Ta-lined cell to 1400° C. at 55 kb. and then slowly heated at constant pressure at 1°C./minute to 1675° C. No crystals were found; only an oxide glass (liquid at high temperature) was found in the quenched material.

Example 5

A mixture of 39 atom percent Li, 27 atom percent B, 34 atom percent N made from appropriate amounts of $Li_3BN_2$, BN and B was reacted in a Ta-lined cell at 55 kb. by heating to 1400° C. at 70° C./minute and then heating at constant pressure at 2° C./minute to 1650° C. The yield of cubic boron nitride was good but was predominantly in the range of 0.05 mm. and below. The effect of decreased Li in nucleating many small crystals is illustrated by this example.

Example 6

A mixture of 41.5% Li+41.5% $Li_3BN_2$+17% B was heated in a Ta-lined cell at 55 kb. to 1400° C. and heating was continued at constant pressure at a rate of 2.5° C./minute over the range of 1400° C. to 1650° C. The quenched product showed evidence of liquid formation and a good yield of cubic boron nitride crystals ranging in size from 0.05 to 0.2 mm. with several crystals in the 0.1 to 0.2 mm. range.

Example 7

A mixture of 57.2% $Li_3BN_2$+13.6% BN+29.2% amorphous boron was heated to 1700° C. at a rate of 850° C./minute at 55 kb. and held at 1700° C. for 5 minutes. Many small crystals of cubic boron nitride were formed (.05 mm. and smaller). Most were one-half the size or less of those formed by slow heating methods using identical cell construction and reaction mixture. A few crystals were nearly as large as those formed by slow heating methods but were not as well faceted.

Example 8

A mixture of 57.2% $Li_3BN_2$+13.6% BN+29.2% B (43 atom percent Li, 25 atom percent B, 32 atom percent N) was heated at 50 kb. in a Ta-lined cell at 1550° C. for 5 hours after rapidly heating (850° C./minute) to this temperature. The yield was predominantly many small crystals (<.05 mm.) of cubic boron nitride. Only a few crystals were as large as 0.1 mm.

Example 9

A mixture of 57.2% $Li_3BN_2$+13.6% BN+29.2% B (43 atom percent Li, 25 atom percent B, 32 atom percent N) was placed in a Ta-lined cell and was heated at 55 kb. at a rate of about 15° C./minute from 1510° C. to 1670° C. and then cooled from 1670° C. at a rate of 32° C./minute. This process gave a good yield of cubic boron nitride crystals in the size range of 0.05 to 0.15 mm. This represents an increase in average size over that obtained in a short static run but are still smaller crystals than are obtained using slower heating rates without programmed cooling.

Example 10

A mixture of 61.7% $Li_3BN_2$+7.9% BN+30.4% B (44.5 atom percent Li, 24 atom percent B, 31.5 atom percent N) was placed in a Ta-lined cell and heated from 1510° C. to 1670° C. at 55 kb. at a rate of 13.3° C./minute and then cooled at 4° C./minute over the same temperature range. The pressure was maintained at 55 kb. The product consisted of cubic boron nitride crystals some of which were 0.1 to 0.2 mm. and the majority were about 0.05 mm.

Example 11

A mixture of 54.2% $Li_3BN_2$+33.3% BN+25% B (39 atom percent Li, 27 atom percent B, 34 atom percent N) was heated in a Ta-lined cell at 55 kb. to 1400° C. at a rate of about 70° C./minute and then to 1660° C. at a rate of 2.2° C./minute and then quenched to room temperature. The entire sample was predominantly very fine grains (<0.05 mm.) of cubic boron nitride.

Example 12

A mixture of high BN content (39.8% B, 43.4% N, 16.8% Li) was heated in a Ta-lined cell at 55 kb. The temperature was raised from room temperature to 1650° C. at a rate of 850° C./minute and held at this temperature for 15 minutes. Excellent conversion was achieved but all crystals were <0.05 mm.

In the following claims reference to the selection of compositions along line P-BN is intended to include compositions to each side of the line as represented by the shaded region shown in FIG. 1.

What we claim as new and desired to secure by Letters Patent of the United States is:

1. In the method of making cubic boron nitride crystals by the simultaneous application of high pressures and high temperatures to a lithium-boron-nitrogen reaction mass, the improvement comprising the steps of:
   (a) selecting for a reaction mass of composition along that line on the phase diagram for the Li-B-N system extending between the ternary invariant point P for a preselected operating pressure to the BN composition designation of 50 atom percent B and 50 atom percent N shown in FIG. 1, said composition having a lithium content of greater than about 40 mole percent,
   (b) applying to the reaction mass said preselected operating pressure in the cubic boron nitride-stable region,
   (c) heating said pressurized composition to a threshold temperature at or below the liquid-forming temperature for the reaction mass,
   (d) continuing to heat, the heating beyond the threshold temperature being at a slow rate in the range of from about 2° to about 15° C./minute to a temperature over about 1650° C. and below about 1750° C.,
   (e) discontinuing the heating,
   (f) releasing the pressure and
   (g) recovering the reaction mass.

2. The improvement of claim 1 wherein slow heating progresses at a rate of from about 2° to about 5° C.

3. The improvement of claim 1 wherein the pressure is about 55 kilobars and slow heating is begun below about 1550° C.

4. The improvement of claim 1 wherein the heating to the threshold temperature is conducted at a rate in excess of 50° C./minute.

References Cited

UNITED STATES PATENTS

| | | | |
|---|---|---|---|
| 2,947,617 | 8/1960 | Wentorf, Jr. | 23—191 X |
| 3,192,015 | 6/1965 | Wentorf, Jr. | 23—191 |
| 3,212,852 | 10/1965 | Bundy | 23—191 |

OTHER REFERENCES

De Vries et al., Chem. Abs., par. 33949k, vol. 71 (1969).

Goubeau et al., Z. Anorg. Chem., vol. 310, pp. 248–260 (1961).

De Vries et al., Materials Research Bulletin, vol. 4, No. 7, pp. 433–441 (1969).

MILTON WEISSMAN, Primary Examiner

U.S. Cl. X.R.

23—295